(12) United States Patent
Bakken et al.

(10) Patent No.: US 9,825,801 B1
(45) Date of Patent: Nov. 21, 2017

(54) SYSTEMS AND METHODS FOR USING SEEKTABLES TO STREAM MEDIA ITEMS

(71) Applicant: Spotify AB, Stockholm (SE)

(72) Inventors: Isak Bakken, Stockholm (SE); Mark Obcena, Stockholm (SE); Swaroop Narsimha, Stockholm (SE); Jyrki Pulliainen, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/489,644

(22) Filed: Apr. 17, 2017

Related U.S. Application Data

(60) Provisional application No. 62/365,904, filed on Jul. 22, 2016.

(51) Int. Cl.
| | |
|---|---|
| G06F 15/16 | (2006.01) |
| H04L 29/06 | (2006.01) |
| H04L 29/08 | (2006.01) |
| G06F 17/30 | (2006.01) |

(52) U.S. Cl.
CPC .. *H04L 29/06027* (2013.01); *H04L 29/08711* (2013.01); *H04L 29/08747* (2013.01); *G06F 17/30902* (2013.01); *H04L 29/0881* (2013.01)

(58) Field of Classification Search
CPC ......... H04L 29/06027; H04L 29/08711; H04L 29/08747
See application file for complete search history.

(56) References Cited

U.S. PATENT DOCUMENTS

| | | | | |
|---|---|---|---|---|
| 5,371,532 A | * | 12/1994 | Gelman ............... | H04M 11/062 348/E7.071 |
| 5,751,336 A | * | 5/1998 | Aggarwal ............. | H04H 20/16 348/E7.071 |
| 6,134,596 A | * | 10/2000 | Bolosky ................. | H04L 29/06 348/E5.008 |
| 6,185,265 B1 | * | 2/2001 | Campanella .......... | H03M 13/15 375/341 |
| 6,535,920 B1 | * | 3/2003 | Parry ..................... | G11B 27/28 375/E7.011 |
| 7,340,500 B2 | * | 3/2008 | Traversat ............. | G06F 9/4416 709/201 |
| 7,633,970 B2 | * | 12/2009 | van Kampen ........ | H04W 28/06 370/473 |
| 2003/0086515 A1 | * | 5/2003 | Trans ...................... | H04B 1/00 375/346 |

(Continued)

*Primary Examiner* — Ranodhi Serrao
(74) *Attorney, Agent, or Firm* — Morgan, Lewis & Bockius LLP

(57) ABSTRACT

A client device receives a request to stream a media item from a first position. Content corresponding to the media item includes samples identified in a container file for the media item. The client device obtains, independently of the container file, a seektable that is not included with the container file and that identifies a plurality of segments into which content corresponding to the media item is divided. Each segment of the plurality of segments includes multiple samples. The client device consults the seektable to determine a segment of the media item to retrieve in response to the request. The segment includes content at the first position. After consulting the seektable, the client device retrieves the segment of the media item and plays the content corresponding to the first position using the retrieved segment.

16 Claims, 6 Drawing Sheets

(56) References Cited

U.S. PATENT DOCUMENTS

| | | | | |
|---|---|---|---|---|
| 2003/0226089 | A1* | 12/2003 | Rasmussen | H04L 1/004 714/758 |
| 2004/0031054 | A1* | 2/2004 | Dankworth | H04L 29/06027 725/86 |
| 2005/0041736 | A1* | 2/2005 | Butler-Smith | H04N 13/004 375/240.01 |
| 2007/0157267 | A1* | 7/2007 | Lopez-Estrada | H04N 21/23424 725/90 |
| 2007/0162611 | A1* | 7/2007 | Yu | G06Q 30/0242 709/232 |
| 2008/0168516 | A1* | 7/2008 | Flick | H04N 21/23106 725/112 |
| 2008/0256418 | A1* | 10/2008 | Luby | H03M 13/27 714/762 |
| 2009/0043906 | A1* | 2/2009 | Hurst | H04N 21/23439 709/231 |
| 2009/0067551 | A1* | 3/2009 | Chen | H04L 1/004 375/340 |
| 2009/0106356 | A1* | 4/2009 | Brase | G06F 17/3002 709/203 |
| 2009/0150557 | A1* | 6/2009 | Wormley | H04N 21/23424 709/231 |
| 2009/0287841 | A1* | 11/2009 | Chapweske | H04L 65/4084 709/231 |

* cited by examiner

500

| Receive, at a client device with one or more processors and memory, a request to stream a media item from a first position within the media item. Content corresponding to the media item includes samples identified in a container file that is associated with the media item — 502 |

- The request is a seek request that is received before playing of content corresponding to the media item has started — 504

- The request is a seek request that is received while playing of content corresponding to the media item is ongoing — 506

- The client device is a first client device and the request is received at the first client device via a second client device that is distinct from the first client device — 508

- The request is generated by the client device, without receiving user input, while the client device is playing content corresponding to the media item from a position within the media item that is before the first position — 510

- The media item is a first media item in a playlist that includes a second media item that is scheduled for playback before the first media item. The request is generated by the client device, without receiving user input, while the client device is playing content corresponding to the second media item — 512

Obtain, independently of the container file, a seektable that is not included with the container file and that identifies a plurality of segments into which content corresponding to the media item is divided. Each segment of the plurality of segments includes multiple samples — 514

- The seektable is stored using a mark-up language (e.g., JSON) that is natively compatible with an SDK executing on the client device. The SDK is provided by a media content provider that facilitates playback of content corresponding to the media item — 516

- Obtain the seektable from the memory of the client device — 518

- Obtain the seektable from a server system — 520

- The seektable is obtained from a first data source and the container file is accessed via a second data source that is distinct from the first data source — 522

Figure 5A

SYSTEMS AND METHODS FOR USING SEEKTABLES TO STREAM MEDIA ITEMS

RELATED APPLICATION

This application claims priority to U.S. Provisional Patent Application Ser. No. 62/365,904, filed Jul. 22, 2016, entitled "Systems and Methods for Using Seektables to Stream Media Items," which application is incorporated by reference in its entirety.

TECHNICAL FIELD

The disclosed implementations relate generally to media content delivery and, in particular, to using seektables to enable efficient streaming of media items.

BACKGROUND

In response to a seek request to play a media item from a particular position, some streaming technologies identify a portion of the media item that is needed to stream the media item from the particular position. For example, metadata that is associated with a container file for the media item is parsed to identify this portion of the media item that is needed. Locating this metadata (e.g., using multiple HTTP range requests to determine which section of the container file includes this metadata), downloading this metadata, and then parsing this metadata are time consuming, cumbersome, and often inefficient tasks that cause streaming of the media item to be delayed and/or cause delays or excessing loading times when responding to seek requests (or initiating playback of a new media item). These drawbacks may interrupt a user's viewing/listening experience while streaming media content and place excessive computational demands on the device controlling playback.

SUMMARY

Accordingly, there is a need for systems and methods that allow for efficient streaming of media item. By relying on a seektable that is independent of a particular media item's container file, the systems and methods disclosed herein enable efficient streaming of media items. In some implementations, the seektable is stored in a native mark-up language that is quickly and easily processed to identify segments of a media item that are used to facilitate playback of the media item. Such systems and methods optionally complement or replace conventional methods for streaming media items and for seeking within media items.

In accordance with some implementations, a method is performed at a client device having one or more processors and memory storing one or more programs for execution by the one or more processors. The method includes receiving a request to stream a media item from a first position within the media item. In some implementations, content corresponding to the media item includes samples identified in a container file that is associated with the media item. The method also includes obtaining, independently of the container file, a seektable that is not included with the container file and that identifies a plurality of segments into which content corresponding to the media item is divided. In some implementations, each segment of the plurality of segments includes multiple samples. The method further includes consulting the seektable (e.g., without consulting metadata included with the container file) to determine a segment of the media item to retrieve in response to the request. The segment includes content at the first position. After consulting the seektable, the method includes retrieving the segment of the media item and playing the content corresponding to the first position using the retrieved segment. This method facilitates prompt (e.g., immediate) playback of media items. The method also reduces the computational load (and thereby reduces power consumption) for the client device by providing an efficient seek process.

In accordance with some implementations, a client device includes one or more processors and memory storing one or more programs configured for execution by the one or more processors. The one or more programs include instructions for performing the operations of the client-side method described above. In accordance with some implementations, a non-transitory computer-readable storage medium is provided. The computer-readable storage medium stores one or more programs configured for execution by one or more processors of the client device; the one or more programs include instructions for performing the operations of the client-side method described above. In accordance with some implementations, a client device includes means for performing the operations of the client-side method described above.

Thus, users are provided with faster, more efficient methods for streaming media items and for seeking within media items while ensuring a prompt playback experience, thereby increasing the effectiveness, efficiency, and user satisfaction associated with media content delivery systems.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 5A-5B are flow diagrams illustrating a method of using a seektable to enable efficient streaming of media items in accordance with some implementations.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first device could be termed a second device, and, similarly, a second device could be termed a first device, without departing from the scope of the various described implementations. The first device and the second device are both devices, but they are not the same device.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
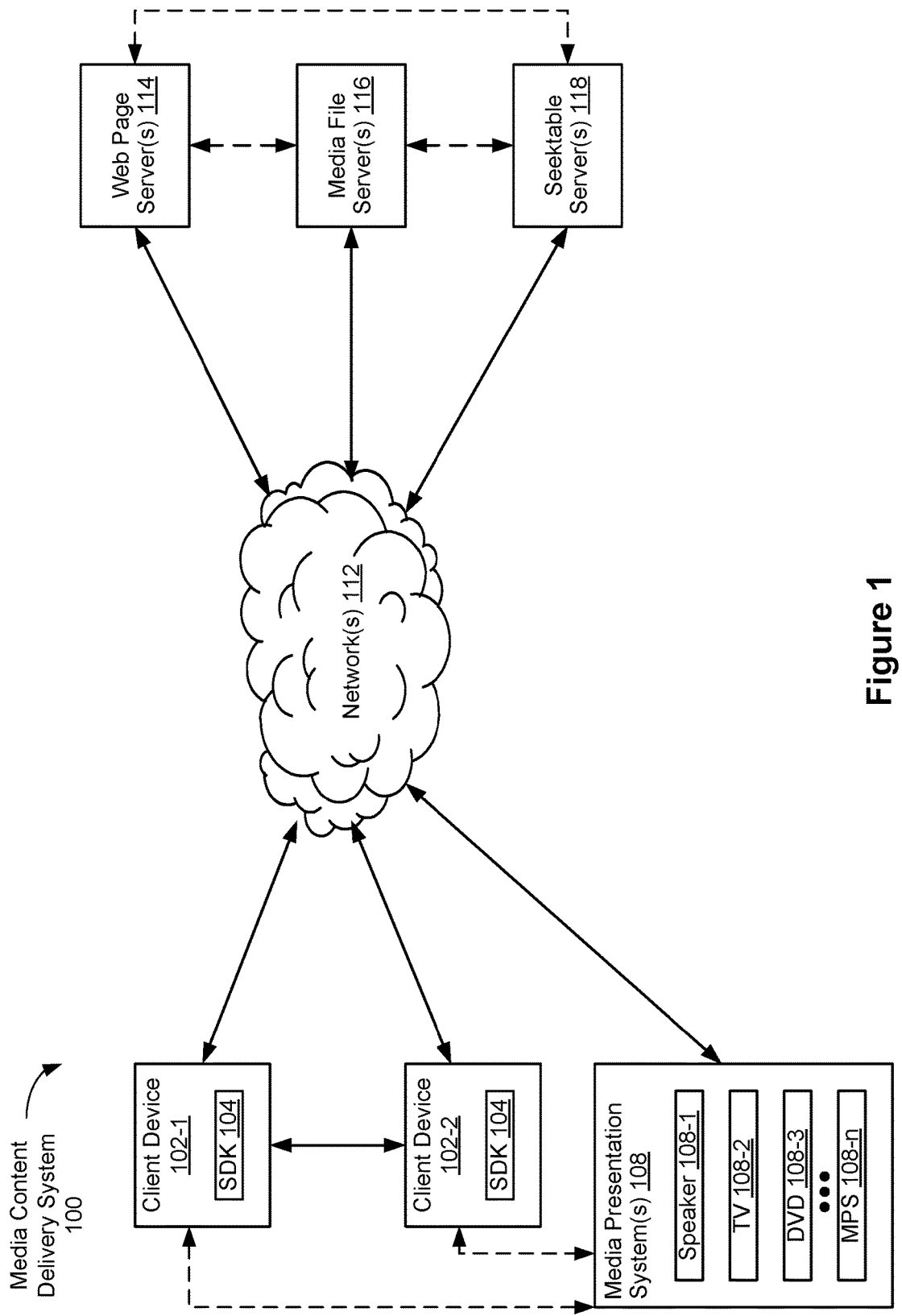
FIG. 1 is a block diagram illustrating an example media content delivery system in accordance with some implementations.

FIG. 1 is a block diagram illustrating an example media content delivery system 100 in accordance with some implementations. The media content delivery system 100 includes one or more client devices 102 (e.g., client device 102-1 and client device 102-2), one or more web page servers (e.g., web page servers 114), one or more media file servers (e.g., media file servers 116), one or more seektable servers (e.g., seektable servers 118), and/or one or more media presentation systems (e.g., media presentation systems 108, including speaker 108-1, television (TV) 108-2, digital versatile disk (DVD) player 108-3, and/or other media presentation system 108-n). One or more networks 112 communicatively connect each component of the media content delivery system 100 with other components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, each client device (e.g. client device 102-1 and/or client device 102-2) is any of: a personal computer, a mobile electronic device (e.g., a wearable computing device or mobile phone), a laptop computer, a tablet computer, a digital media player, or a media dongle (such as a CHROMECAST dongle from GOOGLE INC. of Mountain View, Calif.). In some implementations, client device 102-1 and client device 102-2 are different types of device (e.g., client device 102-1 is a mobile phone that is used to control media content that is presented via client device 102-2, which is a media dongle). Alternatively, client device 102-1 and client device 102-2 are a same type of device (e.g., both are mobile phones).

Client devices 102-1 and 102-2 send and receive information through the networks 112. For example, client devices 102-1 and 102-2, in some implementations, send media control requests (e.g., requests to play, seek within, stop playing, pause playing, etc. for music, movies, playlists, or other media content items) to media file server 116 and/or media presentation system 108 (which may also be considered a client device in accordance with some embodiments) through network(s) 112. Additionally, client devices 102-1 and 102-2, in some implementations, receive media item portions (e.g., segments and samples, as described in more detail below) in response to the media control requests and these media item portions are used to facilitate playback of a respective media item. For example, client device 102-1 (e.g., a mobile phone) receives a seek request from a user to start playback of a respective media item from a first position. In response to receiving the seek request, the client device 102-1 uses software development kit (SDK) 104 (or an application) to locate (e.g., in local memory or via a server) and consult a seektable that is associated with the respective media item. In some implementations, the seektable is independent of (and stored separately from) metadata for the respective media item. In some implementations, the seektable is of a smaller file size than the metadata and, thus, downloading and parsing of the seektable are performed faster than for the metadata.

In some implementations, client device 102-1 and client device 102-2 may also communicate with each other through network(s) 112. For example, client device 102-1 may notify client device 102-2 of the seek request and client device 102-2 may then utilize its own instance of SDK 104 to respond to the seek request by locating and consulting the seektable.

In some implementations, either or both of client devices 102-1 and 102-2 communicate directly with the one or more media presentation systems 108. As pictured in FIG. 1, one of the client devices 102-1 and 102-2 is optionally able to communicate directly (e.g., through a wired connection or through a short-range wireless signal, such as those associated with a wireless local area network technologies such as WiFi, a personal area network such as BLUETOOTH/BTLE communication technologies, radio-frequency-based near field communication technologies, infrared communication technologies, etc.) with media presentation systems 108, while the other client device only communicates with the media presentation systems 108 through network(s) 112. In some implementations, client device 102-2 is a media dongle that uses the direct connection with media presentation systems 108 in order to complete initial setup and configuration operations. For example, client device 102-2 is a media dongle that is physically coupled with a respective media presentation system 108 (such as TV 108-2) and the client device 102-2 uses the direct connection to configure TV 108-2 to work with the client device 102-2.

In some implementations, client device 102-1 and client device 102-2 each include a media application 222 (FIG. 2) that allows a user of the client device to browse media content, request media content for presentation at a media presentation system (e.g., speaker 108-1, TV 108-2, DVD 108-3, . . . Media Presentation System 108-n) associated with the client device, change currently displayed media streams, create and edit playlists, and perform other such operations. The media presentation system may be part of the client device 102, such as built-in speakers or a screen, or may be separate from the client device 102, such as a wirelessly coupled speaker (e.g., speaker 108-1).

In some implementations, the media application 222 also includes an SDK 104 that allows the client devices 102 to utilize seektables to quickly identify appropriate segments of media items, instead of having to inefficiently locate, download, and parse metadata that is associated with container files for the media items. In this way, client devices that include the SDK 104 are able to efficiently deliver prompt (e.g., immediate) playback/streaming of media items and thereby ensure pleasant and uninterrupted viewing/listening experiences for users.

In some implementations, content corresponding to a media item is stored by the client device 102-1 (e.g., in a local cache such as a media content buffer (e.g., media content buffer 250, FIG. 2) and/or in permanent storage at client device 102). In some implementations, content corresponding to the media item (e.g., segments or samples of the content corresponding to the media item) is received from a media file server 116 (e.g., an origin server), which is located remotely from client device 102-1. In some implementations, the media file servers 116 form a media delivery system (or, more generally, a content delivery network). The content corresponding to the media item is then sent (or streamed) from one or more computing devices in the media delivery system to client device 102-1 over one or more networks 112. Content corresponding to the media item is streamed from a source to a destination by transmitting data corresponding to the media item from the source to the destination over time where an electronic device at the destination can perform operations on respective portions of the content corresponding to the media item (e.g., on respective segments or samples) before all content has been completely received (e.g., a first segment of the content corresponding to the media item is received from the source and can be played before a second, later, segment of the content corresponding to the media item is received from the source).

In some implementations, the data sent from (e.g., streamed from) the media file server 116 is stored/cached by a client device (e.g., client device 102-1 or 102-2 or media presentation system 108) in a local cache such as one or more media content buffers 250 (FIG. 2) in the memory of client device. In some implementations, a particular segment of content corresponding to a media item is stored (i.e., buffered) in media content buffer(s) 250 and is removed after the content is presented by the client device (e.g., after all content or just content associated with the particular segment), allowing new media content data to be stored in media content buffer 250. At least some of the content stored in media content buffer(s) 250 is, optionally, retained for a predetermined amount of time after the content is presented by the client device and/or until other predetermined conditions are satisfied. For example, the content is stored until the content has been presented by the client device (or a device connected therewith, such as a TV that is physically coupled with a media dongle), the content corresponding to a media tile is stored until the content corresponding to the media tile has reached an end (e.g., an end of a movie/ television show or sporting event), or the content corresponding to a first media tile is stored until the client device switches to playing content corresponding to a second media tile to enable the user to play the content corresponding to the first media tile again without re-downloading the content (e.g., in response to activation of a "play again" or "replay" affordance in a media player user interface). In some implementations, media content buffer 250 is configured to store media content from more than one media content stream.

An example of a media control request is a request to begin playback (e.g., streaming) of a media item (or content corresponding to the media item) Media control requests may also include requests to control other aspects of media presentations, including but not limited to commands to pause, seek (e.g., skip, fast-forward, rewind, etc.), adjust volume, change the order of items in a playlist, add or remove items from a playlist, adjust audio equalizer settings, change or set user settings or preferences, provide information about the currently presented content, begin presentation of a media stream, transition from a current media stream to another media stream, and the like. In some implementations, media control requests are received at a first client device (e.g., received at a user interface for media application 222 of client device 102-1) and then routed to a second device, for example client device 102-2 (e.g., a media dongle) or media presentation system 108 for further processing (such as to consult a seektable and determine a portion of a media item to retrieve in order to appropriately respond to the media control requests). In some implementations, the first and second client devices 102-1 and 102-2 each perform a portion of the processing based on bandwidth and processing abilities of each device (e.g., if the first or the second device has a faster network connection, then download/retrieval operations may be performed via that device and if the first or second device has a faster processor then processor-intensive operations, such as parsing, may be performed via that device).

In some implementations, media control requests control delivery of content to a client device (e.g., if the user pauses playback of the content, delivery of the content to client device 110-1 is stopped). However, delivery of content to a client device is, optionally, not directly tied to user interactions. For example, content may continue to be delivered to a client device even if the user pauses playback of the content (e.g., so as to increase an amount of the content that is buffered and reduce the likelihood of playback being interrupted to download additional content). In some implementations, if user bandwidth or data usage is constrained (e.g., the user is paying for data usage by quantity or has a limited quantity of data usage available), a client device ceases to download content if the user has paused or stopped the content, so as to conserve bandwidth and/or reduce data usage.

In some implementations, the web page servers 114 respond to requests received from client devices 102 by providing information that is used to render web content (e.g., rendered within a web browser or within a portion of the media application 222) at a client device.

In some implementations, the media file servers 116 respond to requests received from client devices 102 (e.g., requests identifying byte start and byte end positions for needed portions of media items) by providing media content (e.g., for the identified byte start and byte end positions).

In some implementations, the seektable servers 118 respond to requests received from client devices 102 (e.g., a request for a seektable associated with a particular media item) by providing the seektable. In some implementations, the seektable is provided before playback/streaming of the particular media item has started (i.e., the seektable is pre-fetched in accordance with a determination that the particular media item is scheduled for playback within a predetermined amount of time, such as within 10, 15, or 20 seconds). In some implementations, the seektable is then cached locally at the client devices 102 for later use. In some implementations, the seektable is provided in response to a seek request during playback (e.g., during streaming).

The above brief descriptions of the servers 114, 116, and 118 are intended as a functional description of the devices, systems, processor cores, and/or other components that provide the functionality attributed to each of these servers. It will be understood that the servers may form a single server computer, or may form multiple server computers. Moreover, the servers may be coupled to other servers and/or server systems, or other devices, such as other client devices, databases, content delivery networks (e.g., peer-to-peer networks), network caches, and the like. In some implementations, the servers are implemented by multiple computing devices working together to perform the actions of a server system (e.g., cloud computing). In some implementations, the servers 114, 116, and/or 118 (e.g., all three servers, or any two of the three servers) are combined into a single server system).

As described above, media presentation systems 108 (e.g., speaker 108-1, TV 108-2, DVD 108-3, . . . Media Presentation System 108-*n*) are capable of receiving media content (e.g., from the client devices 102) and presenting the received media content. For example, in some implementations, speaker 108-1 is a component of a network-connected audio/video system (e.g., a home entertainment system, a radio/alarm clock with a digital display, or an infotainment system of a vehicle). In some implementations, media presentation systems 108 are devices to which the client devices 102 (and/or the servers 114, 116, and/or 118) can send media content. For example, media presentation systems include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figure 2:
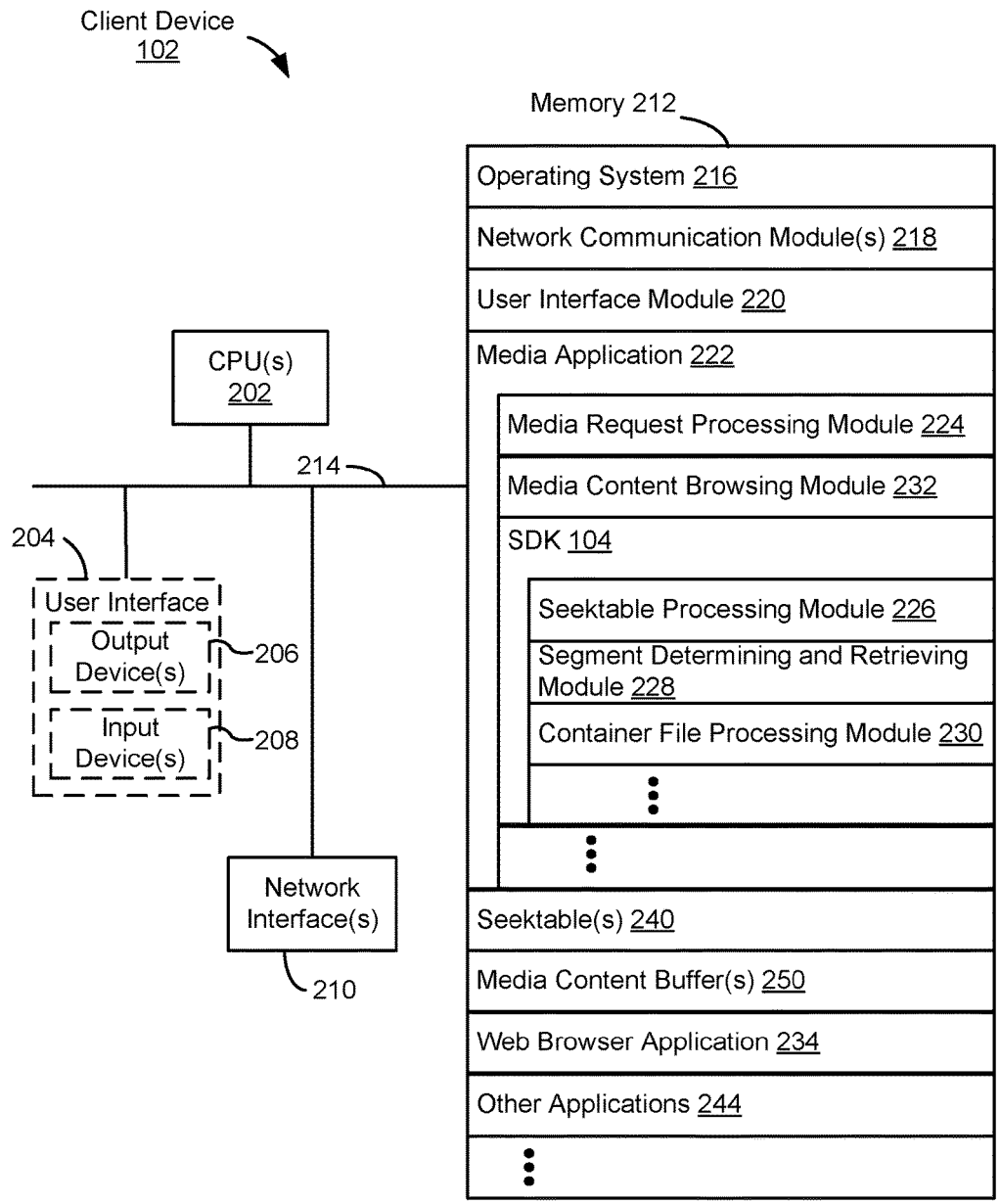
FIG. 2 is a block diagram illustrating an example client device in accordance with some implementations.

FIG. 2 is a block diagram illustrating an example client device 102 (e.g., client device 102-1 and/or client device 102-2 of FIG. 1) in accordance with some implementations. The client device 102 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 optionally includes a user interface 204, including output device(s) 206 and input device(s) 208. In some implementations, the input devices include a keyboard, mouse, or track pad. Alternatively, or in addition, in some implementations, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 206) also optionally include speakers or an audio output connection connected to speakers, earphones, or headphones. Furthermore, some client devices 102 optionally use a microphone and voice recognition device to supplement or replace the keyboard. Optionally, the client device 102 includes an audio input device (e.g., a microphone) to capture audio (e.g., speech from a user). Optionally, the client device 102 includes a location-detection device, such as a GPS (global positioning satellite) or other geo-location receiver, and/or location-detection software for determining the location of the client device 102.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

an operating system 216 that includes procedures for handling various basic system services and for performing hardware dependent tasks;

network communication module(s) 218 for connecting the client device 102 to other computing devices (e.g., other client devices 102, media presentation systems 108, and/or servers 114, 116, and/or 118) via the one or more network interface(s) 210 (wired or wireless) connected to one or more network(s) 112 such as the Internet, other WANs, LANs, PANs, MANs, VPNs, peer-to-peer networks, content delivery networks, ad-hoc connections, and so on;

a user interface module 220 that receives commands and/or inputs from a user via the user interface 204 (e.g., from the input devices 208, which may include keyboards, touch screens, microphones, pointing devices, eye tracking components, three-dimensional gesture tracking components, and the like), and provides user interface objects and other outputs for display on the user interface 204 (e.g., the output devices 206, which may include a computer display, a television screen, a touchscreen, a speaker, etc.);

a media application 222 (e.g., an application associated with a media content provider, including a media player, a streaming media application, or any other appropriate application or component of an application) for browsing, receiving, processing, and presenting media content (e.g., media content streams, media content files, advertisements, web pages, videos, audio, games, etc.). The media application 222 also includes the following modules (or sets of instructions), or a subset or superset thereof:

a media request processing module 224 for receiving and processing media control requests. In some implementations, the media request processing module 224 communicates with an SDK 104 to ensure that media control requests are processed efficiently;

a media content browsing module 232 for providing controls and/or user interfaces enabling a user to navigate, select for playback, and otherwise control or interact with media content, whether the media content is stored locally or remotely;

an SDK 104 for processing seektables, determining and retrieving media item segments, and processing container files associated with media items. The SDK 104 also includes the following modules (or sets of instructions), or a subset or superset thereof:

a seektable processing module 226 for retrieving and processing seektables in order to quickly and efficiently identify segments of content corresponding to a media item to retrieve in response to media control requests (e.g., requests to play or seek content corresponding to the media item);

a segment determining and retrieving module 228 for utilizing information from the seektable processing module 226 (e.g., information identifying each segment that is associated with a media item, as discussed in more detail in reference to FIG. 4 below) to determine an appropriate segment for retrieval in response to a media control request; and a container file processing module 230 for processing container files associated with media items. In some implementations, a respective container file for a respective media item includes metadata that is used to enable finer seeking than is available using the seektable alone (e.g., after determining and retrieving a particular segment using the seektable, metadata from a container file is used to enable finer seeking to particular samples within the particular segment);

seektables 240 (e.g., low-resolution seektables, discussed in more detail below in reference to FIG. 4) for identifying respective segments associated with respective media items;

media content buffers 250 for storing (e.g., at least temporarily) content corresponding to a media item;

a web browser application 234 (e.g., Internet Explorer by Microsoft, Firefox by Mozilla, Safari by Apple, or Chrome by Google) for accessing, viewing, and interacting with web sites; and other applications 244, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above-identified elements may be stored in one or more of the previously mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various implementations. Memory 212 optionally stores a subset or superset of the modules and data structures identified above. Memory 212 optionally stores additional modules and data structures not described above.

Figure 3:
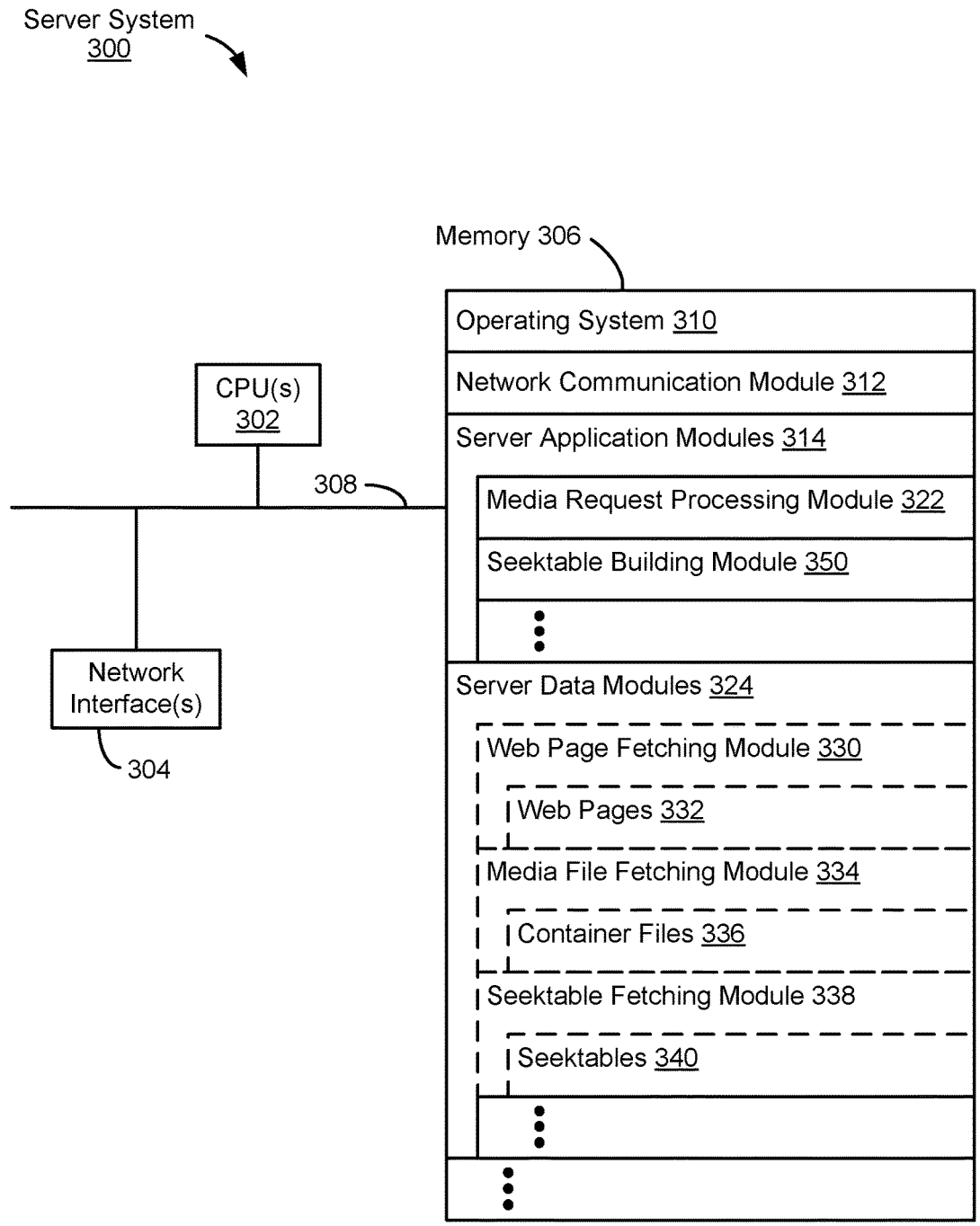
FIG. 3 is a block diagram illustrating an example server system in accordance with some implementations.

FIG. 3 is a block diagram illustrating an example server system 300 in accordance with some implementations. The server 300 typically includes one or more central processing units/cores (CPUs) 302, one or more network interfaces 304, memory 306, and one or more communication buses 308 for interconnecting these components. In some implementations, the server system 300 is a single server system that includes the one or more web page servers 114, the one or more media file servers 116, and/or the one or more seektable servers 118. In some implementations, the server system 300 represents a single one of the servers 114, 116, or 118 and includes a subset of the modules shown in FIG. 3 (as described below).

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the server system 300 to other computing devices via one or more network interfaces 304 (wired or wireless) connected to one or more networks 112 such as the Internet, other WANs, LANs, PANs, MANs, VPNs, peer-to-peer networks, content delivery networks (CDNs), ad-hoc connections, and so on;

one or more server application modules 314 for enabling the server system 300 to perform various functions, the server application modules 314 including, for example:

a media request processing module 322 for processing requests for media content and facilitating access to requested media content items by client devices (e.g., client devices 102 and/or media presentation systems 108) including, optionally, streaming media content to such devices or to one or more media presentation systems 108 (e.g., speaker 108-1, FIG. 1); and a seektable building module 350 for building seektables that divide content corresponding to media items into segments and the respective seektables that are built include information that allows client devices to determine segments to retrieve in response to media control requests (e.g., seek requests);

one or more server data module(s) 324 for handling the storage of and access to media content items and metadata relating to the media content items; in some implementations, the one or more server data module(s) 324 include:

a web page fetching module 330 for fetching data that is communicated to client devices to enable presentation of web page content corresponding to the web pages 332. In some implementations, the server system 300 includes the modules 330 and 332 and does not include the modules 334, 336, 338, and 340 (e.g., when the server system 300 represents one or more of the web page servers 114 only);

a media file fetching module 334 for fetching content corresponding to media items (e.g., a particular segment or sample of a media item). In some implementations, the media file fetching module 334 facilitates retrieval of segments and samples of content corresponding to respective media items and may also facilitate retrieval of container files 336 that each include metadata and information identifying samples for respective media items. In some implementations, the server system 300 includes the modules 334 and 336 and does not include the modules 330, 332, 338, and 340 (e.g., when the server system 300 represents the media file servers 116 only); and a seektable fetching module 338 for fetching seektables 340 in response to requests from client devices. In some circumstances, the seektable fetching module proactively fetches seektables 340 and provides them to client devices (e.g., in accordance with a determination that a particular media item is scheduled for playback for a playlist within a predetermined amount of time, the module 338 fetches the seektable for that particular media item and provides it to the client device in a proactive fashion and before receiving an explicit request from the client device). In some implementations, the server system 300 includes the modules 338 and 340 and does not include the modules 330, 332, 334, and 336 (e.g., when the server system 300 represents the seektable servers 116 only).

In some implementations, the server system 300 optionally includes one or more of the following server application modules (not pictured in FIG. 3): (i) a segmentation module for dividing a media file or content corresponding thereto into segments and/or samples and distributing the segments and/or samples to one or more computing devices (e.g., sources) in a media delivery system (e.g., distributing segments of the file to different peers in a P2P network so as to enable different segments of the file to be received from different peers and used to generate the media content at a receiving client); and (ii) a context tracking module for tracking and storing the context of a media content stream, optionally including storing, among other data, one or more of the current playback position in a media content stream that is currently being presented, the position in a current playlist, the play history of a user, the preferences of a user, previously skipped media content, whether media content items were "liked" or "disliked" (e.g., via "starred," "thumbs-up," and/or "thumbs-down" indications), and the like.

In some implementations, the server system 300 optionally includes one or more of the following server data modules (not pictured in FIG. 3): (i) a context database for storing information associated with one or more media content streams, the database optionally including information about one or more of the current playback position in a media content stream, metadata relating to the media, a position in a playlist, play history of a user, user preferences, skipped media, and user settings; (ii) a user profile database for storing account information for a plurality of users, where the account information for a respective user, optionally includes a user media content request/playback history, a list of electronic devices associated with the respective user, user preferences, user interests, and other such information; and (iii) a source table for storing information indicating the location or address of sources in a media delivery system storing respective segments or samples of media content and, optionally, information indicating which computing devices store which portions of media content.

In some implementations, the server system 300 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above-identified modules stored in memory 306 corresponds to a set of instructions for performing a function described herein. The above-identified modules or programs (i.e., sets of instructions) need not be implemented as separate software programs, procedures, or modules, and thus various subsets of these modules may be combined or otherwise re-arranged in various implementations. In some implementations, memory 306 optionally stores a subset or superset of the respective modules and data structures identified above. Furthermore, memory 306 optionally store additional modules and data structures not described above.

Although FIG. 3 illustrates the server system 300 in accordance with some implementations, FIG. 3 is intended more as a functional description of the various features that may be present in one or more server systems than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. As noted above, the server system 300 may represent a system that includes each of the servers 114, 116, and 118; any two of the servers 114, 116, and 118, or a single one of the servers 114, 116, and 118). The actual number of servers used to implement the server system 300, and how features are allocated among them, will vary from one implementation to another and, optionally, depends in part on the amount of data traffic that the server system must handle during peak usage periods as well as during average usage periods.

Figure 4:
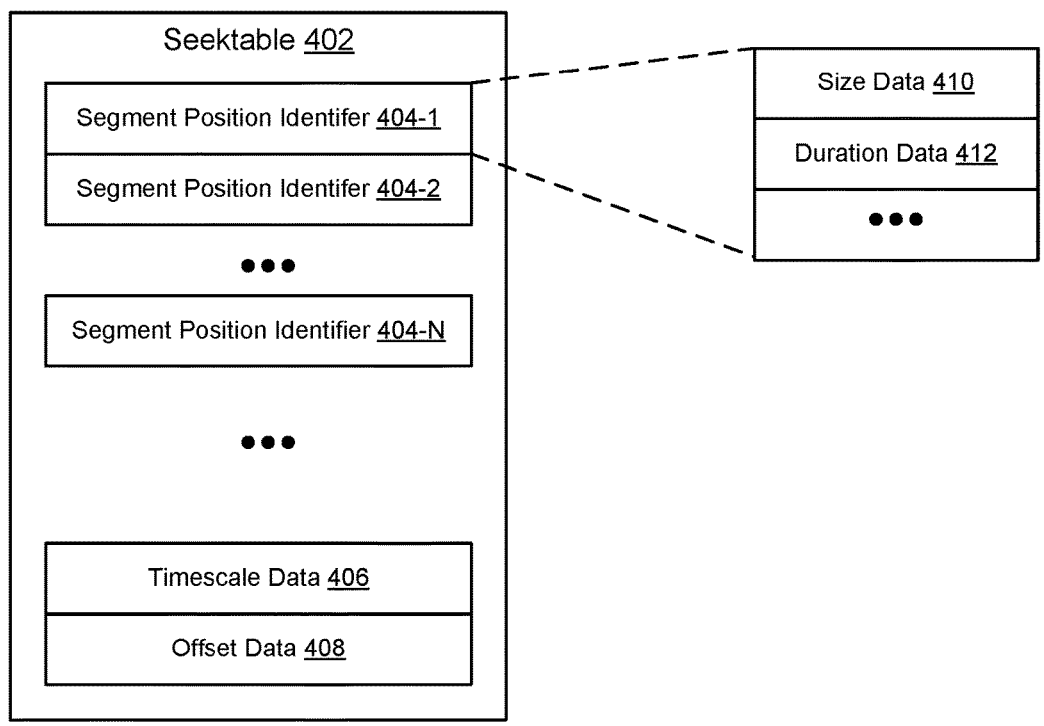
FIG. 4 is a block diagram illustrating an example seektable in accordance with some implementations.

FIG. 4 is a block diagram illustrating a seektable data structure 402 (also referred to as a "seektable 402"), in accordance with some implementations. The seektable data structure 402 includes a plurality of segment position identifiers (e.g., segment identifiers 404-1 through 404-N, FIG. 4) for identifying start and end positions (e.g., a byte start and byte end position) for each segment that is associated with a particular media item, timescale data 406, and offset data 408. In some implementations, each respective segment position identifier 404 is represented as a pair of size and duration data 410, 412. Appendix A includes an example of an algorithm that is used to help parse and process seektables. In the example algorithm shown in Appendix A, a first segment is identified as starting from byte position 0 and ending at the offset, and subsequent segments are identified based on respective size, duration pairs.

In some implementations, size data 410 for a respective segment position identifier may be any information that enables a client device to determine or extrapolate an offset (e.g., a byte offset) from the start of a media file (or some other specified point within the media file) to the start of the respective segment (or some other specified point within the respective segment). For example, the size data 410 optionally includes a size (e.g., in bytes) of the respective segment, a delta (e.g., in bytes) indicating the size difference between a previous segment and the respective segment, and/or an offset (e.g., in bytes) from the start of the media file (or some other specified point within the media file) to the start of the respective segment (or some other specified point within the media file).

In some implementations, duration data 412 for a respective segment may be any information that enables a client device to determine or extrapolate a time of the start and/or end of the respective segment relative to the start of content corresponding to a media item (or some other specified point within the content corresponding to the media item). For example, the duration data 412 optionally includes an absolute duration of the respective segment (or some other specified point within the respective segment) relative to the start of the media file (or some other specified point within the media file), a duration of the respective segment in units of time between the start time of the respective segment and the end time of the respective segment, and/or a delta in units of time between the start time of a previous segment in the media item and the start time of the respective segment.

In some implementations, the offset data 408 is any information that enables a client device (e.g., client device 102-1) to determine or extrapolate an offset (e.g., a byte offset indicating a number of bytes) from the start of a particular media file (or some other specified point within the media file) to the start of a segment of the media file (or some other specified point within the segment) or a time offset indicating a number of time units (e.g., milliseconds, seconds, minutes, etc.) from the start of the media file (or some other specified point) to the start of the segment. In some implementations, the offset data 408 is used to identify start and end positions (e.g., byte start and byte end positions) of a first segment of a media file, and then size, duration pairs for each respective segment are used to identify remaining segments (an example of this algorithm is shown in Appendix A).

In some implementations, the seektable 402 is stored using a mark-up language that is natively compatible with a software development kit (e.g., SDK 104, FIGS. 1 and 2) or application that consults the seektable 402. For example, an example seektable that is stored using JavaScript Object Notation (JSON) is presented in Table 1 below:

TABLE 1

Example Seektable Stored using JSON

{"padding samples": 0,
"encoder delay samples": 1024,
"pssh":
"AAAAU3Bzc2gAAAAA7e+
LqXnWSs6jyCfc1R0h7QAAADMIARIQ5DlkImNJQ3QaGIz
O/CjcohoHc3BvdGlmeSIU5DlkImNJQ3QaGIzO/Cjconx/EZw=",
"timescale": 44100,
"index range": [986, 1269],
"segments": [[322980, 441344], [337844, 441344], [341611, 441344],
[335262, 441344], [328289, 441344], [337160, 441344], [329102,
441344],
[331636, 441344], [329979, 441344], [331034, 441344], [332059,
441344],
[340644, 441344], [332916, 441344], [334937, 441344], [329104,
441344],
[331577, 441344], [327417, 441344], [334814 ,441344], [330186,
441344],
[331201, 441344], [24195, 31744]],
"offset": 1270}

As shown in Table 1, the example seektable has a node for "segments" that includes size, duration pairs for each segment identifier (e.g., a first segment has a size of 322980 and a duration of 441344), a "timescale" node that identifies a time scale for segments identified in the example seektable, a "pssh" node that includes a parallel ssh key that is used to decode respective segments as they are received by a client device from a server, and "encoder_delay_samples," "padding_samples," and "index_range" nodes. In some implementations, seektables may include a subset or superset of the nodes identified in the example seektable of Table 1.

As shown for the example JSON seektable of Table 1 and in FIG. 4, seektables may be obtained that are independent of (and may be stored separately from) container files for media items. In some implementations, such seektables have a lower resolution than metadata that is associated with container files for media items and are referred to as low-resolution seektables. In some implementations, a low-resolution seektable for a particular media item is smaller in file size as compared to metadata in a container file for the particular media item. For example, the metadata is retrieved from a moov atom that is part of a representation of the media item, such as a header portion of an MP4 container file. In some implementations, the low-resolution seektable enables coarse seeking (i.e., seeking at a first level of granularity) within content corresponding to the media item. The metadata in the container file enables fine seeking (i.e., seeking at a second level of granularity, which is finer than the first level) within content corresponding to the media item. For example, in response to a seek request to seek to a particular position while playing content corresponding to the media item, the low-resolution seektable is used to quickly determine and retrieve a needed segment and the metadata is used to identify and retrieve a sample at the particular position within the segment.

In some implementations, seektables are pre-computed and stored in a particular content delivery network (CDN). In some implementations, the seektables are pre-computed as part of an automated batch process (e.g., a nightly or hourly batch process for building seektables for media items that have been recently added to the particular CDN) or upon receipt/addition of new media files for the particular CDN (e.g., each time a new media item is added, the CDN automatically initiates a process for building/generating a seektable for the new media item). In some implementations, the seektable for the new media item is constructed by parsing metadata for a container file associated with the new media item. Because segments correspond to larger portions of the media item than the portions (e.g., samples) identified by the container-file metadata (and thus less information identifying positions of the segments needs to be stored in the seektable as compared to the amount of information that is needed to identify positions of each of the more numerous portions identified in the metadata), the seektable for the new media item is smaller in size relative to the metadata for that same new media item. In some circumstances, the metadata associated with the new media item is 100 KB while the seektable is approximately 1/10th the size of the metadata (10 KB).

Figure 5B:
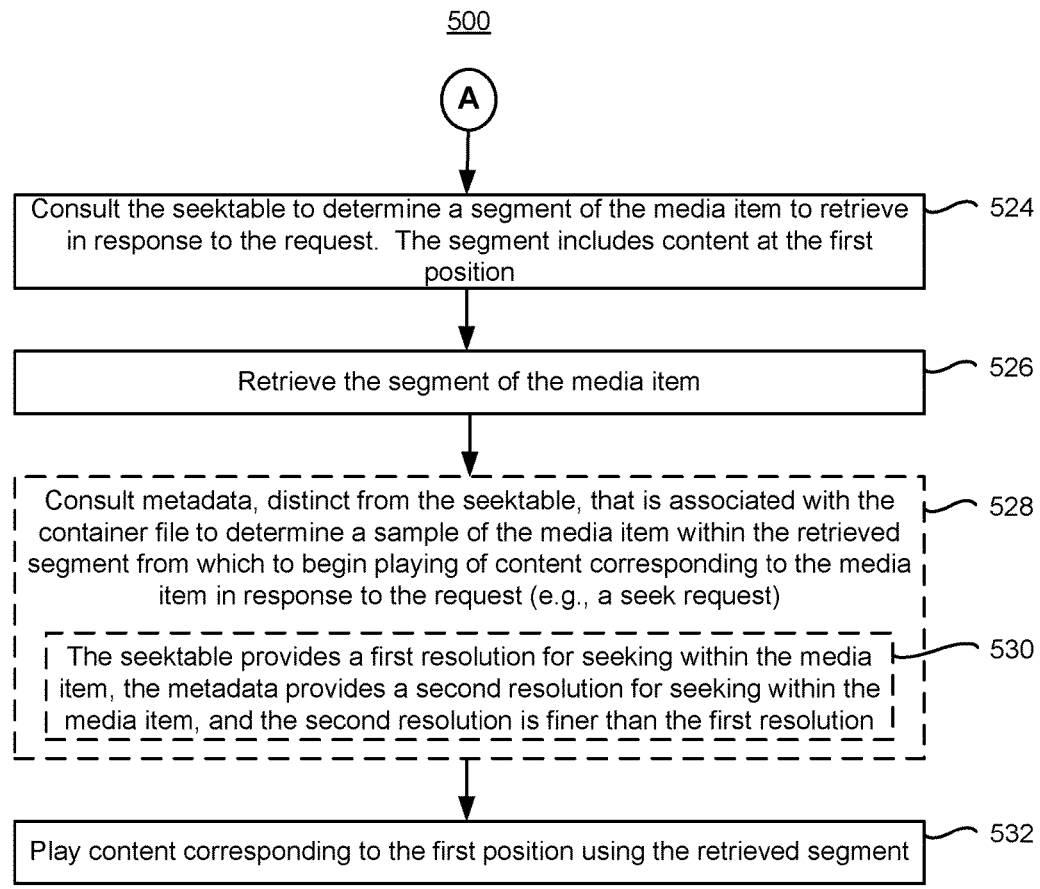

FIGS. 5A-5B are flow diagrams illustrating a method 500 of enabling efficient streaming of media items at a client device using a seektable obtained independently of a media-item container file.

The method 500, in accordance with some implementations, is performed by a client device (e.g., client device 102-1 or 102-2, or media presentation system 108, FIG. 1). For example, the method 500 is performed by a client device 102-2 (FIG. 1), such as a media dongle plugged into an external port (e.g., HDMI or USB) of a television. In some implementations, the method is performed at a JavaScript SDK that is executing on the media dongle (e.g., SDK 104, FIGS. 1-2). FIGS. 5A-5B correspond to instructions stored in a computer memory or other computer-readable storage medium (e.g., memory 212 of the client device 102, FIG. 2).

Referring now to FIG. 5A, the client device receives (502) a request to stream a media item from a first position within the media item. Content corresponding to the media item includes samples identified in a container file that is associated with the media item. In some implementations, the request may have a variety of characteristics depending on a type of the request, when the request is received, and from which type of device the request is received.

In some implementations, the request may optionally have one or more of the characteristics shown in operations 504-512. As a first example, the request is a seek request that is received before playing of content corresponding to the media item has started (504) (e.g., a user selects a song from within a media application and concurrently seeks to the first position within that song). As a second example, the request is a seek request that is received while playing of content corresponding to the media item is ongoing (506) (e.g., a user selects a song, playback of that song begins at a client device 102 or media presentation system 108 that is in communication with the client device, and then the user seeks to the first position).

As a third example, the client device is a first client device (e.g., a media dongle, such as client device 102-2, FIG. 1) (e.g., a media presentation system 108, FIG. 1) and the request is received at the first client device via a second client device (e.g., client device 102-1, FIG. 1) that is distinct from the first client device (508). For example, the user selects a particular song at the second client device and information about the selected song is transmitted to the first client device (e.g., information identifying the selected song and information identifying the first position from which to begin streaming) for further processing. In some implementations, the second client device controls playback/streaming at the first client device (i.e., a user interacts with a media application on the second client device, such as a mobile phone, and as the user selects media items or submits seek requests those are transmitted to the first client device).

As a fourth example, the request is generated by the client device, without receiving user input, while the client device is playing content corresponding to the media item from a position within the media item that is before the first position (510). The client device generates the request while playback is ongoing (e.g., at the client device or a media presentation system in communication with the client device) so that each portion (e.g., segment) of a media item is retrieved before content corresponding to that portion is needed for playback.

As a fifth example, the media item is a first media item in a playlist that includes a second media item that is scheduled for playback before the first media item (512). The request is generated by the client device, without receiving user input, while the client device is playing content corresponding to the second media item. In this way, the client device is able to request content corresponding to a next scheduled media item and ensure that a transition from playback of the first media item to playback of the second media item is prompt (e.g., seamless and without interruption in a user's viewing/listening experience).

In some implementations, requests may have features of two of the examples described above. For instance, the requests of operation 508 may be the seek request of either operation 504 or 506. In some implementations, any of the requests correspond to a request to stream the media item at the client device or at a media presentation system that is in communication with the client device (e.g., the client device submits specific requests for segments and/or samples of a media item to a media file server 116 and, in response, the media file server 116 provides those segments and/or samples to the media presentation system for playback). In some implementations, the request is received via a media application (e.g., media application 222, FIG. 2) that has an instance of a JavaScript SDK (e.g., SDK 104, FIG. 2) running and the request is communicated via a predefined communication protocol for further processing.

The client device obtains (514), independently of the container file, a seektable that is not included with the container file and that identifies a plurality of segments into which content corresponding to the media item is divided (e.g., seektable 402, FIG. 4). Each segment of the plurality of segments includes multiple samples. In some implementations, each of the plurality of segments corresponds to a longer duration of the media item than each of the multiple samples (e.g., each respective segment corresponds to a four second duration portion of the media item and each respective sample corresponds to a 20-25 ms duration portion of the media item).

In some implementations, the seektable is stored (516) using a mark-up language (e.g., JSON) that is natively compatible with an SDK (e.g., SDK 104, FIGS. 1 and 2) or application executing on the client device (as shown for the example seektable in Table 1 above). In some implementations, the SDK is provided by a media content provider that facilitates playback of content corresponding to the media item.

In some implementations, the seektable is obtained from the memory of the client device (518) or the seektable is obtained from a server system, such as the seektable server 118 (520). For example, the seektable is initially obtained from the server system in response to the request (e.g., to facilitate initial playback or streaming of the media item) and is stored locally at the client device for subsequent consultation in order to continue playback of the media item.

In some implementations, the seektable is obtained (522) from a first data source (e.g., the seektable server 118) and the container file is accessed (separately and independently) via a second data source (e.g., media file server 116) that is distinct from the first data source. For example, the first and second data sources correspond to distinct content distribution networks (e.g., distinct server systems or distinct peers responsible for storing/distributing various segments of media files). In some implementations, distinct CDNs are utilized in order to help improve performance of the method 500 (e.g., in some circumstances, browsers limit the number of requests that may be made to a single CDN and, thus, by utilizing distinct CDNs more simultaneous request may be made to each distinct CDN without running into browser-imposed request limitations). In other implementations, the first and second data sources correspond to a single content distribution network (e.g., a single server system 300, FIG. 3).

Turning now to FIG. 5B, the client device consults (524) the seektable to determine a segment of the media item to retrieve in response to the request. The segment includes content at the first position. In some implementations, the seektable is consulted to determine the segment and metadata included in the container file is not consulted. The client device retrieves (526) the segment of the media item (e.g., by submitting an HTTP range request to the media file server 116 for a byte start and byte end position from the media item).

In some implementations, before receiving the request, the client device downloads and stores the seektable in its memory. In these implementations, consulting the seektable includes accessing the seektable as stored in the memory of the client device. The seektable is pre-fetched by the client device to ensure that it is available for quick and easy local use by the client device.

In some implementations, the client device consults metadata (528) (e.g., after consulting the seektable to determine the segment), distinct from the seektable, that is associated with the container file to determine a sample of the media item within the retrieved segment from which to begin playing of content corresponding to the media item in response to the request. In some implementations, the seektable provides a first resolution for seeking within the media item, the metadata provides a second resolution for seeking within the media item, and the second resolution is finer than the first resolution (530).

The client device then plays (532) content corresponding to the first position using the retrieved segment. In some implementations, the client device initially consults the seektable to determine the segment and the client device subsequently consults metadata obtained from the container file to determine a sample within the media item at which to begin playback from the first position. In some implementations, playing of the content corresponding to the first position using the retrieved segment begins after playing of the content corresponding to a preceding media item is complete (e.g., the second media item of operation 512), such as when the preceding media item has completed playing or a user submits a request to skip to a next track in a playlist.

In this way, the method 500 is able to avoid downloading/loading/retrieving extra information (and analyzing that extra information) about a media item (such as non-music bytes for the media item (e.g., metadata retrieved via a moov atom of an MP4 container for the media item)) and instead only retrieves the segment that enables streaming of the media item starting from the first position. The processing time to locate this extra information (in some circumstances, multiple HTTP range requests are required in order to locate the extra information), download this extra information, and then parse that extra information (in some implementations, this parsing requires time- and resource-intensive byte-level parsing) is avoided and, thus, streaming of media files begins much more quickly relative to conventional techniques for media streaming.

Although various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, performed at a client device with one or more processors and memory storing instructions for execution by the one or more processors, the method comprising:
   receiving a seek request to stream a media item from a first position within the media item while playing of content corresponding to the media item is ongoing, wherein the content corresponding to the media item includes samples identified in a container file that is associated with the media item;
   consulting metadata, distinct from a seektable, that is associated with the container file to determine a sample of the media item from which to begin playing of content corresponding to the first position in response to the seek request;
   obtaining the seektable, independently of the container file, wherein the seektable is not included with the container file and identifies a plurality of segments into which the content corresponding to the media item is divided, wherein each segment of the plurality of segments includes multiple samples;
   consulting the seektable to determine a segment of the media item to retrieve in response to the seek request, the segment including the content corresponding to the first position;
   after consulting the seektable, retrieving the segment of the media item; and
   playing the content corresponding to the first position using the retrieved segment.

2. The method of claim 1, wherein obtaining the seektable comprises obtaining the seektable in response to the seek request.

3. The method of claim 1, further comprising:
   before receiving the seek request, downloading and storing the seektable in the memory;
   wherein consulting the seektable comprises accessing the seektable as stored in the memory.

4. The method of claim 1, wherein:
   the client device is a first client device, and
   receiving the seek request comprises receiving the seek request via a second client device that is distinct from the first client device.

5. The method of claim 1, wherein the seek request is generated by the client device, without receiving user input, while the client device is playing the content corresponding to the media item from a position within the media item that is before the first position.

6. The method of claim 5, wherein obtaining the seektable comprises obtaining the seektable from the memory of the client device.

7. The method of claim 1, wherein:
   the seektable is stored using a mark-up language that is natively compatible with a software development kit (SDK) executing on the client device; and
   the SDK is provided by a media content provider that facilitates playback of the content corresponding to the media item.

8. The method of claim 7, wherein the mark-up language is JavaScript Object Notation (JSON).

9. The method of claim 1, wherein:
   the container file includes metadata identifying offsets corresponding to the samples.

10. The method of claim 1, wherein:
    the seektable is obtained from a first data source and
    the container file is accessed via a second data source that is distinct from the first data source.

11. The method of claim 10, wherein the seek request is received via a web page that is accessed by the client device via information received from a third data source, distinct from the first and the second data sources.

12. The method of claim 1, wherein the client device is a media dongle that is physically coupled with a display system.

13. The method of claim 1, wherein the client device is a network-connected television.

14. A client device, comprising:
one or more processors; and
memory storing one or more programs, which when executed by the one or more processors cause the client device to:
receive a seek request to stream a media item from a first position within the media item while playing of content corresponding to the media item is ongoing, wherein the content corresponding to the media item includes samples identified in a container file that is associated with the media item;
consult metadata, distinct from a seektable, that is associated with the container file to determine a sample of the media item from which to begin playing of content corresponding to the first position in response to the seek request;
obtain the seektable, independently of the container file, wherein the seektable is not included with the container file and identifies a plurality of segments into which the content corresponding to the media item is divided, wherein each segment of the plurality of segments includes multiple samples;
consult the seektable to determine a segment of the media item to retrieve in response to the seek request, the segment including the content corresponding to the first position;
after consulting the seektable, retrieve the segment of the media item; and
play the content corresponding to the first position using the retrieved segment.

15. A non-transitory computer-readable storage medium storing one or more programs configured for execution by one or more processors of a client device, the one or more programs comprising instructions for:
receiving a seek request to stream a media item from a first position within the media item while playing of content corresponding to the media item is ongoing, wherein the content corresponding to the media item includes samples identified in a container file that is associated with the media item;
consulting metadata, distinct from a seektable, that is associated with the container file to determine a sample of the media item from which to begin playing of content corresponding to the first position in response to the seek request;
obtaining the seektable, independently of the container file, wherein the seektable is not included with the container file and identifies a plurality of segments into which the content corresponding to the media item is divided, wherein each segment of the plurality of segments includes multiple samples;
consulting the seektable to determine a segment of the media item to retrieve in response to the seek request, the segment including the content corresponding to the first position;
after consulting the seektable, retrieving the segment of the media item; and
playing the content corresponding to the first position using the retrieved segment.

16. A non-transitory computer-readable storage medium storing one or more programs configured for execution by one or more processors of a client device, the one or more programs comprising instructions for:
receiving a request, generated by the client device without receiving user input, to stream a media item from a first position within the media item while the client device is playing content corresponding to the media item from a position within the media item that is before the first position, wherein the content corresponding to the media item includes samples identified in a container file that is associated with the media item;
obtaining, independently of the container file, a seektable from a memory of the client device, wherein the seektable is not included with the container file and identifies a plurality of segments into which the content corresponding to the media item is divided, wherein each segment of the plurality of segments includes multiple samples;
consulting the seektable to determine a segment of the media item to retrieve in response to the request, the segment including content corresponding to the first position;
after consulting the seektable, retrieving the segment of the media item; and
playing the content corresponding to the first position using the retrieved segment.

* * * * *